(12) United States Patent
Britton et al.

(10) Patent No.: US 7,690,675 B2
(45) Date of Patent: *Apr. 6, 2010

(54) BODY RECEPTACLE FOR A WHEELED FRAME

(75) Inventors: Daniel W. Britton, Calgary (CA); Andreas Gehlen, Cologne (DE)

(73) Assignee: 634182 Alberta Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/245,658

(22) Filed: Oct. 3, 2008

(65) Prior Publication Data

US 2009/0026817 A1 Jan. 29, 2009

Related U.S. Application Data

(62) Division of application No. 11/519,364, filed on Sep. 11, 2006, now Pat. No. 7,431,324, which is a division of application No. 10/658,785, filed on Sep. 9, 2003, now abandoned.

(30) Foreign Application Priority Data

Sep. 10, 2002 (DE) ............................... 102 42 198

(51) Int. Cl.
B62B 1/00 (2006.01)
(52) U.S. Cl. .................. 280/658; 280/650; 280/657
(58) Field of Classification Search ............... 280/650, 280/658, 657, 647, 47.38, 642, 204, 203, 280/292, 656, 651, 644; 297/467, 219.12, 297/250.1
See application file for complete search history.

(56) References Cited

U.S. PATENT DOCUMENTS

| | | | |
|---|---|---|---|
| 2,829,702 A | 4/1958 | Keating | |
| 3,578,380 A | 5/1971 | Jacobus | |
| 3,747,955 A | 7/1973 | MacAlpine | |
| 4,157,839 A | 6/1979 | Lahti | |
| 4,324,430 A | 4/1982 | Dimas, Jr. | |
| 4,655,502 A | 4/1987 | Houllis | |
| 4,666,207 A | 5/1987 | Quartano | |
| 4,729,571 A | 3/1988 | Tienstra | |
| 4,729,572 A | 3/1988 | Bergeron | |
| 4,750,783 A | 6/1988 | Irby | |
| 4,824,168 A | 4/1989 | Makoski | |
| 4,834,403 A | 5/1989 | Yanus | |
| 5,020,814 A * | 6/1991 | George et al. ............... 280/204 |
| 5,076,599 A | 12/1991 | Lockett | |
| 5,219,203 A | 6/1993 | Switlik | |
| 5,238,293 A | 8/1993 | Gibson | |
| 5,261,683 A | 11/1993 | Kurdziel | |
| 5,292,142 A | 3/1994 | Vitarelli | |
| 5,460,395 A * | 10/1995 | Chen ......................... 280/204 |
| 5,573,410 A | 11/1996 | Stepniak | |

(Continued)

FOREIGN PATENT DOCUMENTS

DE 207434 8/1907

(Continued)

*Primary Examiner*—Hau V Phan
(74) *Attorney, Agent, or Firm*—Christensen O'Connor Johnson Kindness PLLC

(57) ABSTRACT

A body receptacle for a wheeled frame allows for the transport of babies in a bicycle trailer. The body receptacle has a flexible mat that is brought into the intended transport form with the help of tensioning devices.

7 Claims, 2 Drawing Sheets

U.S. PATENT DOCUMENTS

| | | |
|---|---|---|
| 5,641,200 A | 6/1997 | Howell |
| 5,785,333 A | 7/1998 | Hinkston |
| 5,829,835 A | 11/1998 | Rogers |
| 5,846,093 A | 12/1998 | Muench, Jr. |
| 5,921,571 A | 7/1999 | Bell |
| 5,934,757 A | 8/1999 | Smith |
| 5,954,404 A | 9/1999 | Suzuki |
| 5,967,606 A | 10/1999 | Bergh |
| 5,979,921 A | 11/1999 | Derven |
| 5,984,332 A | 11/1999 | Beaudoin |
| 6,053,518 A | 4/2000 | Chiu |
| 6,195,572 B1 * | 2/2001 | Patterson et al. ............ 455/570 |
| 6,332,785 B1 | 12/2001 | Muench, Jr. |
| 6,338,637 B1 | 1/2002 | Muench, Jr. |
| 6,489,554 B1 | 12/2002 | Bertini |
| 6,517,366 B2 | 2/2003 | Bertini |
| 6,705,628 B2 | 3/2004 | Kahmann |
| 6,811,418 B2 | 11/2004 | Jazowski |
| 6,843,685 B1 | 1/2005 | Borgstrom |
| 6,959,938 B1 | 11/2005 | Liu |
| 7,052,085 B2 * | 5/2006 | Hoey-Slocombe et al. ............................................................. 297/219.12 |
| 7,431,324 B2 * | 10/2008 | Britton et al. ............... 280/658 |

FOREIGN PATENT DOCUMENTS

| | | |
|---|---|---|
| DE | 320587 | 12/1915 |
| DE | 382776 | 12/1921 |
| DE | 7711961 | 11/1977 |
| DE | 9215797.1 U1 | 4/1993 |
| DE | 4303719 A1 | 8/1994 |
| DE | 20107010 U1 | 8/2001 |
| EP | 0339890 A2 | 11/1989 |
| EP | 0422812 A1 | 4/1991 |
| FR | 2701655 A1 | 8/1994 |
| GB | 175742 A | 2/1922 |
| GB | 2165443 A | 4/1986 |
| WO | 01/89907 A1 | 11/2001 |

* cited by examiner

BODY RECEPTACLE FOR A WHEELED FRAME

CROSS-REFERENCE TO RELATED APPLICATION

This application is a divisional of U.S. application Ser. No. 11/519,364, filed Sep. 11, 2006, entitled BODY RECEPTACLE FOR A WHEELED FRAME, which is a divisional of U.S. application Ser. No. 10/658,785, filed Sep. 9, 2003, now abandoned. The disclosures of which are all hereby expressly incorporated by reference.

FIELD OF THE INVENTION

The invention relates to a receptacle for a wheeled frame, in particular for the transportation of babies or infants.

BACKGROUND OF THE INVENTION

Transportation of infants and babies in bicycle trailers is not readily possible, because the bicycle trailer seats are not designed for this. Due to the lack of suitable solutions for this problem, infant seats designed for use in cars are often placed in bicycle trailers and attached therein with belts. While an infant can, in principle, be transported in a bicycle trailer in such manner, this has the distinct disadvantage that infant car seats are very bulky and generally wider than the area of the seat provided for one child. This is particularly problematic with bicycle trailers with two seats, since once the car seat is placed in the bicycle trailers, there is hardly any room left for a second child, let alone a second infant car seat.

The only option available on the market for transporting babies in a bicycle trailer is a hard polystyrene infant seat made by the German manufacturer Weber Technik Werkzeugbau GmbH, which contrary to the aforementioned car seats has been tailored to the width of the child seat of a bicycle trailer. This carrier has a concave reclining seat area, the bottom area of which is flattened out opposite the back and shoulder area. It has a passage opening in the center just below the bottom area as well as several pairs of passage openings on both sides of the central vertical axis in the shoulder area for the belts of a restraint system. In addition, there are fastener openings in the upper and lower area of the carrier, through which the belts of a bicycle trailer seat can be threaded in order to attach the carrier.

This carrier, too, has some distinct disadvantages. It is bulky, which makes fastening the carrier in a bicycle trailer seat difficult and does not allow for space-saving storage, for instance in a warehouse or a garage. The carrier is rigid so that it does not adapt to the position and movement of a baby or infant. Finally, the carrier is not breathable, which is particularly uncomfortable on warm days or when sitting in the carrier for an extended period of time.

SUMMARY OF THE INVENTION

The basic idea of the invention consists in making the body receptacle from a flexible material which can be brought into the shape necessary for transporting the baby/infant by bracing the material externally and/or within itself, as required. Bracing externally means that there are tensioning devices extending from or outside of the body receptacle that are attached to the frame in such a way that they exert tension on the mat. In this case such tensioning devices can be, for example, lengthwise adjustable belts with springs. Bracing "within itself" means that the tensioning devices find support in the material itself when under tension. Such internal bracing is possible, for example, with spring poles which are inserted into hemmed seams in the mat and inserted—under tension—into the anchoring points of the mat, similar to a self-supporting dome tent.

The body receptacle according to the invention has a variety of advantages over the baby carrier described above. Thus, when not in use, the flexible mat can be folded and stored compactly after the tensioning devices have been removed. Moreover, even in its transport form, it still has a certain degree of flexibility so that the mat adapts somewhat to a body shape. This makes lying/sitting in the body receptacle more comfortable, as does the fact that the flexible mat can be made partially or totally from breathable material. Finally, attaching the body receptacle in a wheeled frame, in particular in a bicycle trailer, is much easier, at least if it is first attached and then brought into its transport form with the help of tensioning devices.

In a preferred embodiment of the mat, there are sidewalls in the bottom area, which prevent the infant (infants) from slipping out sideways. The sidewalls work together particularly with a restraint system, which prevent the transported infant (infants) from slipping out of the body receptacle by stabilizing the position of the infant's body.

In order to increase the comfortableness of the mat, the sidewalls are preferably padded and/or made from an air permeable fabric.

To stabilize the sides of the body receptacle, there are belts that preferably run lengthwise to the mat. While these belts can in principle be located at the level of the supporting area that supports the underside of the body, it is preferable that they run along the upper edges of the sidewalls. Belts are particularly well suited to stabilize the body receptacle because they can be put under considerable tension. Moreover, the ends of the belts can be fitted with fastening elements, with which the body receptacle can be suspended in a frame or braced therein with the help of tensioning devices.

The lengthwise-arranged belts can be run through tubular sleeves, which are preferably made from a foamed material, so that the belts are padded. The belts can be attached inside the sleeves, by for example sewing or gluing. The sleeves can be embedded in hemmed seams running lengthwise along the sides of the mat or along the upper edges of the sidewalls.

The sleeves can be elastic and/or foldable, so that they can be folded or rolled compactly with the mat without causing damage to the sleeve material.

In addition, the sleeves are preferably curved lengthwise and the mat in its supporting area can be preformed concavely in the working position. A pre-forming of the mat can, for example, be done by sewing the sidewalls and the supporting area together in such a way that it results in a bottom area that is angled from the back and shoulder area. This makes installing and, in particular, pulling the body receptacle into its transport shape easier.

In another embodiment, the front edge of the mat is fitted with padding, which is raised with respect to the supporting area. On one hand, this helps stabilize the mat crosswise. On the other hand, the padding provides a safeguard against the baby or infant sliding out, in particular while buckling the child into the mat.

The stabilization of the mat crosswise to its longitudinal axis is preferably done with the help of a strap fastened to the backside of the mat and running crosswise to its longitudinal axis, the ends of which are fitted with fastening elements. In particular, if this strap is located in the bottom area of the supporting area, it can be used to stretch the body receptacle in such a way that this results in an angle between the bottom area and the back and shoulder area of the supporting area, especially when the mat is braced accordingly at the upper and lower ends of its longitudinal direction. Alternatively, it is also possible to provide a strap at each side of the backside of the mat, with which the mat can be braced towards the back.

In order to adjust the position of the body receptacle and the forces necessary to brace it, it is helpful if the length of the belts can be adjusted at least at one end.

In order to make installation easier, at least one of the fastening elements can be constructed as a snap buckle working together with its corresponding counter-piece, which is attached to the frame.

In order to make sitting or lying in the body receptacle more comfortable, at least some of its surfaces can be fitted with fleece, in particular the padded areas.

Being particularly durable, it is preferable to use textile fabrics for the mat. In particular, it makes sense to use a textile fabric for the bottom of the mat and, in a preferred further embodiment, to cover it with a layer of foamed plastic for padding. That way, the requirements with respect to both the strength of the material and comfortableness can be met as far as the supporting area is concerned, in particular if the padding is also breathable.

As a restraint system to keep the baby or infant being transported safe in the event of a bump or collision of the frame, the mat can be fitted with safety belts, which is attached in particular in the stabilized areas of the mat, for example in the areas of the lengthwise or crosswise belts. If the frame is already fitted with a restraint system, the supporting area can have openings for the safety belts of the restraint system. The location of the openings can be the same as with the infant car seats described hereinbefore.

The above leads to the conclusion that the body receptacle is preferably used in the frame of the passenger compartment of a bicycle trailer.

BRIEF DESCRIPTION OF THE DRAWINGS

In the following, the invention is described in further detail with the help of two illustrations showing a preferred embodiment of the invention.

DETAILED DESCRIPTION OF THE PREFERRED EMBODIMENT

Figure 1:
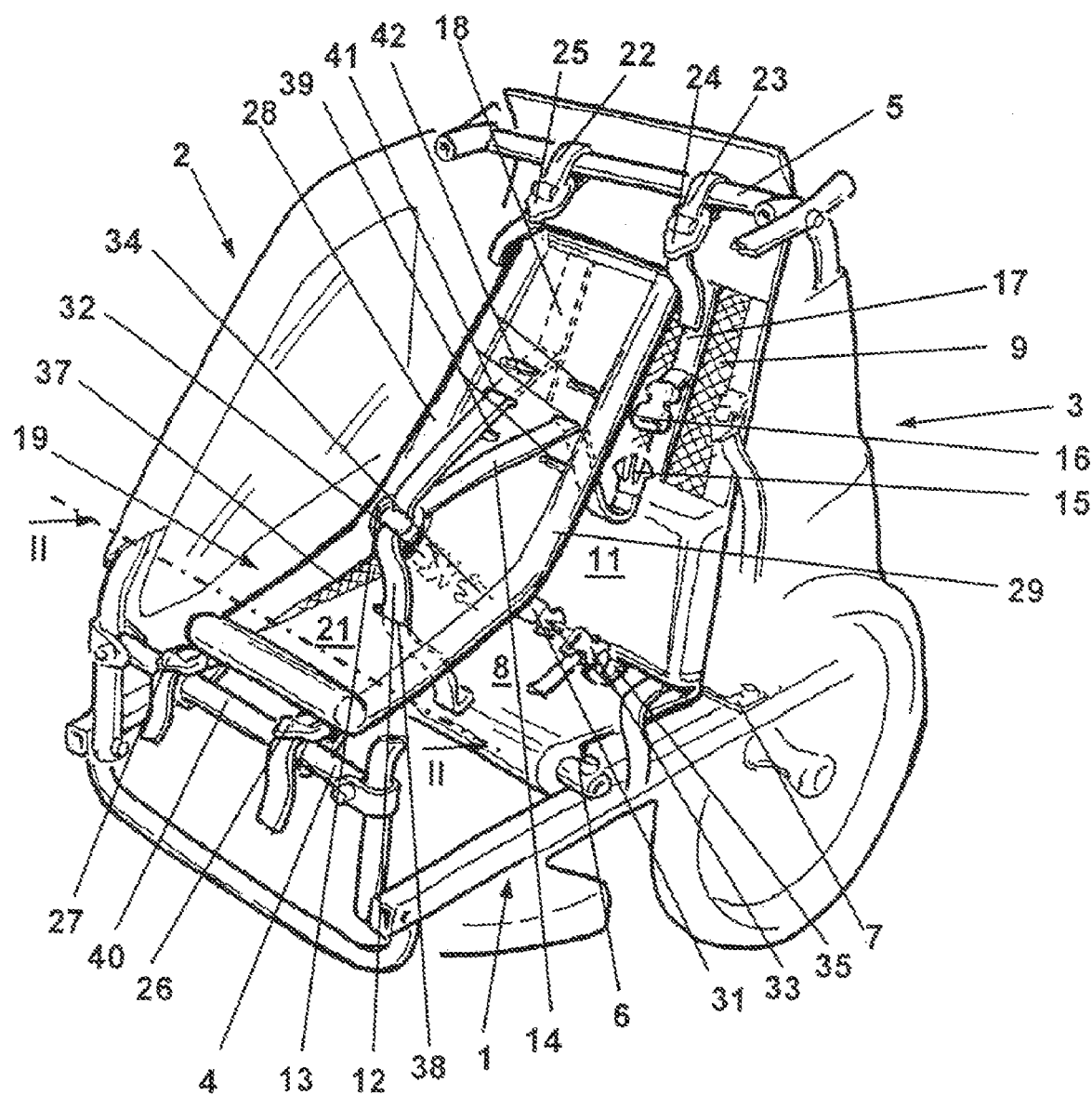
FIG. 1 is a perspective drawing of a bicycle trailer with a suspended body receptacle.

The frame of the bicycle trailer shown in FIG. 1 consists of the following main parts: a chassis 1 as well as a passenger compartment located thereon with one part of the frame forming the front and top of the passenger compartment 2 and a passenger compartment rear side 3. The partial frame 2 has a cross strut 4 located on its front side above the chassis 1, which is positioned much lower than a cross tube 5 provided at the upper end of the passenger compartment rear side.

On the chassis 1, two crossbars arranged in tandem 6, 7 are provided, to which, among other things, the front and rear edge of a seating area 8 is anchored. Between the rear crossbar 7 and the cross tube 5 provided at the upper edge of the rear of the frame, a rear wall 9 is inserted, which has a padded backrest 11 sewn to its lower part. In the center of the front edge of the seating area 8, a crotch strap 12 of a restraint system is anchored, which works together with a shoulder belt 14 via a ring 13, with both ends of the shoulder belt 14 having snap closures 15, 16 with which they can be attached to the rear wall 9. The parts of the snap closures 16 located on the rear wall 9 are attached to belts 17, 18 positioned side by side in such way that their height can be adjusted.

Between the cross strut 4 and the cross tube 5, a body receptacle 19 with a mat forming a lying/sitting area 21 is suspended. The body receptacle is held by two belts 22, 23 running along its sides, the ends of which are looped around the cross strut 4 and the cross tube 5, respectively, and fastened with buckles 24, 25, 26, 27. The belts are run through tubular sleeves 28, 29 made from a foamed material, that form a part of the side walls of the body receptacle and as such provide a safeguard against the baby slipping out.

The body receptacle 19 is braced with belts 31, 32 arranged on both sides of the hip area on the backside of the mat 21, which via closures 33, 34 work together with belts 35 attached to the rear crossbar 7.

By bracing the mat 21 in this manner, it is angled in the hip area so that the bottom area is angled relative to the back and shoulder area and in particular the bottom area is oriented more horizontally than the back and shoulder area.

Between the tube-like sleeves 28, 29 and the mat 21, mesh fabric 37 is sewn in, which is tapered lengthwise towards the upper and lower edge of the infant carrier so that the height of the side walls is increased, in particular in the bottom area.

In the mat 21, openings are provided to lead through the safety harness of the restraint system as follows: one opening 38 slightly below the center of the bottom area for the crotch strap 12 including the ring 13 attached thereto, and three pairs of openings 39, 41, 42 arranged one above the other in the shoulder area of the mat 21 on both sides of the central longitudinal axis for leading through the shoulder belt 14.

At its lower end, mat 21 ends with a crosswise padded roll 40 which safeguards the baby or infant from slipping out of the body receptacle 19, in particular prior to or while being buckled in.

Figure 2:
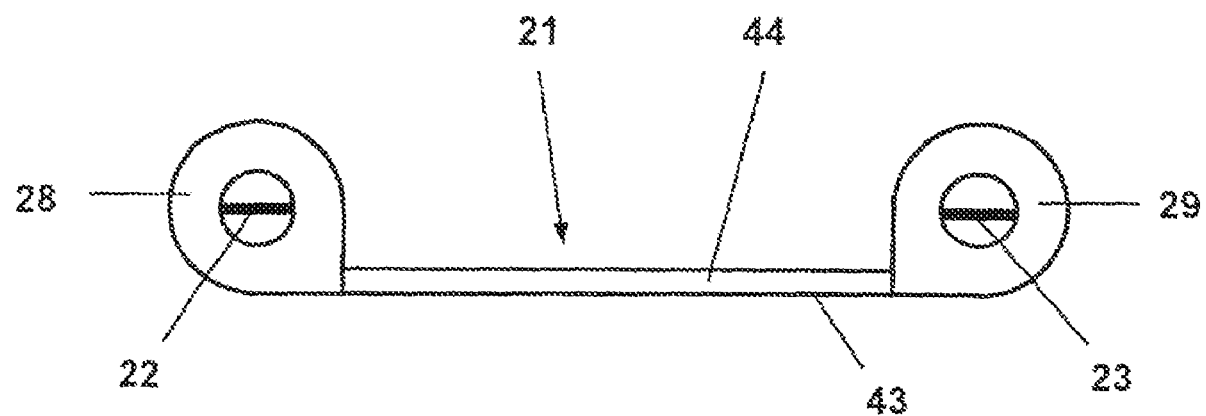
FIG. 2 is a cross-section of the body receptacle along the line of cross-section II-II in FIG. 1.

The cross-section shown in FIG. 2 shows particularly well that belts 22, 23 are run through the tubular sleeves 28, 29. The bottom side of the mat 21 is made of a textile material 41 in which the tubular sleeves 28, 29 are sewn in on both sides of mat 21. Between the tubular sleeves, the top side of the textile material 43 is covered with foamed, breathable padding 44.

Many further modifications to the apparatus described and illustrated will readily occur to those skilled in the art to which the invention pertains. The specific embodiments described and illustrated herein should be considered only as illustrated and not be considered limiting of the scope of the claims.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A body receptacle for supporting a child in a child carrier, the body receptacle comprising: a flexible mat including a front surface, a backside surface, an upper end a lower end a first lengthwise side and a second lengthwise side; a first tensioning belt extending along the first lengthwise side and including a upper free end extending out from the upper end of h flexible mat and a lower end extending out from the lower end of the flexible mat and a second tensioning belt extending along the second lengthwise side and including a upper free end extending out from the upper end of the flexible mat and a lower free end extending out from the lower end of the flexible mat, the flexible mat being connected and supported between the first and second tensioning belts and formed concave to curve away rearwardly from between the first and second tensioning belts; installation fasteners connected on the upper free ends of the first and second tensioning belts and installation fasteners connected on the lower free ends of the first and second tensioning belts.

2. The body receptacle of claim 1, further comprising a child restraint mounted on the flexible mat to be accessible on the front surface thereof to secure a child, the child restraint being operable to secure the child apart from use of the first and second tensioning belt.

3. The body receptacle of claim 2, further comprising apertures through the flexible mat for accepting child restraint straps therethrough, the apertures opening on the front surface between the upper end, the lower end, the first lengthwise side and the second lengthwise side.

4. The body receptacle of claim 3, wherein the apertures include a crotch strap opening for a crotch strap to be run therethrough, and at least one pair of shoulder strap openings.

5. The body receptacle of claim 1, further comprising sidewalls arranged on at least a portion of the first and second lengthwise side edges of the flexible mat, the sidewalls each including an upper edge spaced from the flexible mat and wherein the first am second tensioning belts are secured along the upper edges of the sidewalls to tension the upper edges of the sidewalls relative to the flexible mat.

6. The body receptacle according to claim 5, wherein the upper edges of the sidewalls are formed as tubular sleeves and the first and second tensioning belts extend lengthwise through the tubular sleeves.

7. The body receptacle according to claim 1, further comprising a tubular sleeve secured at each lengthwise side edge of the flexible mat; and first and second tensioning belts extending lengthwise through the tubular sleeves.

* * * * *

UNITED STATES PATENT AND TRADEMARK OFFICE
CERTIFICATE OF CORRECTION

PATENT NO.       : 7,690,675 B2
APPLICATION NO.  : 12/245658
DATED            : April 6, 2010
INVENTOR(S)      : D. W. Britton et al.

It is certified that error appears in the above-identified patent and that said Letters Patent is hereby corrected as shown below:

| COLUMN | LINE | ERROR |
|---|---|---|
| 4 (Claim 1, | 57 line 3) | after "upper end" insert --,-- |
| 4 (Claim 1, | 58 lines 3-4) | after "lower end" insert --,-- |
| 4 (Claim 1, | 60 line 6) | "a upper" should read --an upper-- |
| 4 (Claim 1, | 61 line 7) | "of h flexible" should read --of the flexible-- |
| 4 (Claim 1, | 63 line 9) | "a upper" should read --an upper-- |
| 5 (Claim 3, | 11 line 1) | "claim 2," should read --claim 1,-- |
| 6 (Claim 5, | 5 line 5) | "first am second" should read --first and second-- |

Signed and Sealed this
Twenty-fifth Day of January, 2011

David J. Kappos
*Director of the United States Patent and Trademark Office*